United States Patent
Schondorf et al.

(10) Patent No.: US 8,517,418 B2
(45) Date of Patent: Aug. 27, 2013

(54) CHILD RESTRAINT SYSTEM AND VEHICLE CONTAINING SAME

(75) Inventors: Steven Yellin Schondorf, Dearborn, MI (US); Abraham Philip, Rochester Hills, MI (US); David James Tippy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 13/170,543

(22) Filed: Jun. 28, 2011

(65) Prior Publication Data

US 2013/0001938 A1  Jan. 3, 2013

(51) Int. Cl.
*B60N 2/42* (2006.01)

(52) U.S. Cl.
USPC ............... 280/733; 280/730.1; 297/216.11; 297/256.16

(58) Field of Classification Search
USPC ............ 280/728.1, 730.1, 733; 297/216.11, 297/256.16
See application file for complete search history.

(56) References Cited

U.S. PATENT DOCUMENTS

| | | | |
|---|---|---|---|
| 3,897,081 A | | 7/1975 | Lewis |
| 4,834,420 A | * | 5/1989 | Sankrithi et al. ............ 280/728.1 |
| 5,368,328 A | * | 11/1994 | Kamiyama et al. ........... 280/733 |
| 5,413,377 A | | 5/1995 | Kamiyama et al. |
| 5,711,574 A | | 1/1998 | Barnes |
| 5,720,519 A | | 2/1998 | Barnes |
| 5,779,304 A | * | 7/1998 | Cunningham ........... 297/216.11 |
| 5,833,311 A | * | 11/1998 | Friedrich et al. ......... 297/216.11 |
| 6,237,999 B1 | * | 5/2001 | Hobson .................... 297/256.15 |
| 6,254,129 B1 | * | 7/2001 | Rink et al. ..................... 280/736 |
| D458,042 S | | 6/2002 | Zakovic et al. |
| 6,736,455 B1 | * | 5/2004 | Zakovic et al. .......... 297/256.15 |
| 7,232,182 B2 | * | 6/2007 | Yoshida ................... 297/216.11 |
| 7,293,828 B2 | | 11/2007 | Yoshida |
| 7,413,220 B2 | * | 8/2008 | Itoga et al. .................... 280/742 |
| 2006/0208471 A1 | | 9/2006 | Sundararajan et al. |

FOREIGN PATENT DOCUMENTS

EP  0884224 A1  12/1998

OTHER PUBLICATIONS

M.J. Wolanin; General Motors Corp. et al., Dummies—Description and Basis of a Three-Year-Old Child Dummy or Evaluating Passenger Inflatable Restraint Concepts, ID No. 826040 Abstract, SAE Papers, Jan. 1, 1982, 1 pg., National Highway Traffic Safety Administration, Washington, DC, USA.

Chantal Parenteau et al., Field Data Analysis of Rear Occupant Injuries, Part I: Adults and Teenagers, ID No. 2003-01-0153, Mar. 3-6, 2003, 10 pgs., www.sae.org, SAE Technical Paper Series, SAE International, 2003 SAE World Congress, Detroit, MI, USA.

* cited by examiner

*Primary Examiner* — Ruth Ilan
*Assistant Examiner* — James English
(74) *Attorney, Agent, or Firm* — Frank A. MacKenzie; Brooks Kushman, P.C.

(57) ABSTRACT

A vehicle has an inflatable occupant restraint system that includes an inflatable occupant protection device and an inflator operable to inflate the inflatable occupant protection device when a predetermined event occurs. The vehicle also includes a child restraint system having a portable child seat with an inflatable child protection apparatus attached thereto. The child restraint system includes a connection interface connected to the child seat and adapted for connection to the occupant restraint system such that the child protection apparatus is inflated when the predetermined event occurs.

18 Claims, 3 Drawing Sheets

CHILD RESTRAINT SYSTEM AND VEHICLE CONTAINING SAME

TECHNICAL FIELD

The present invention relates to a child restraint system for a vehicle and a vehicle containing such a restraint system.

BACKGROUND

Providing child restraint systems for vehicles has long been a concern of the automotive industry. Portable child seats are frequently used to help ensure the safety of infants and small children when they are passengers in a vehicle. One way to secure the child seats and facilitate attachment to and removal from the vehicle is to use the "LATCH" (Lower Anchors and Tethers for Children) system.

Passive restraint systems such as airbags have long been used in automobiles to protect older children and adults. Recently, the Ford Motor Company has developed a rear inflatable belt (RIB) system to help protect occupants in the middle and rear vehicle seats, who might not otherwise have the benefit of an airbag that would deploy in front of them. The RIB system includes a seatbelt with shoulder harness configured similarly to a conventional seatbelt except that it is inflatable based on the same triggers used to inflate steering wheel and dashboard airbags. Combining this technology, or some variation thereof, with a portable child seat, could provide an improved child restraint system for a vehicle.

SUMMARY

Embodiments of the present invention include a vehicle having an inflatable occupant restraint system that has an inflatable occupant protection device and an inflator configured to inflate the inflatable occupant protection device upon the occurrence of a predetermined event. Such a predetermined event may include, for example, a negative acceleration that is greater than (in a negative sense) or equal to a predetermined amount. The vehicle includes a child restraint system having a portable child seat configured to be secured to a seat in the vehicle. It also includes an inflatable protection apparatus attached to the child seat that has a fluid connector operatively attached thereto. The vehicle further includes a connection system operatively connected to the occupant restraint system and configured for connection to the fluid connector. This connection is such that the inflator inflates the inflatable protection apparatus that is attached to the child seat when the predetermined event occurs.

Embodiments of the invention also include a vehicle having an inflatable occupant restraint system that includes an inflatable occupant protection device and an inflator operable to inflate the inflatable occupant protection device when a predetermined event occurs. The vehicle includes a portable child seat having an inflatable child protection apparatus attached thereto, and a connection system operatively connected to the occupant restraint system and connectable to the child restraint system such that the child protection apparatus is inflated when the predetermined event occurs.

Embodiments of the invention also include a child restraint system for a vehicle. The vehicle has an inflatable occupant restraint system including an inflatable occupant protection device and an inflator configured to inflate the inflatable occupant protection device upon the occurrence of a predetermined event. The child restraint system includes a portable child seat configured to be secured to a seat in the vehicle. It also includes an inflatable protection apparatus attached to the child seat, and a connection interface connected to the child seat and adapted for connection to the occupant restraint system such that the inflator inflates the inflatable protection apparatus attached to the child seat when the predetermined event occurs.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
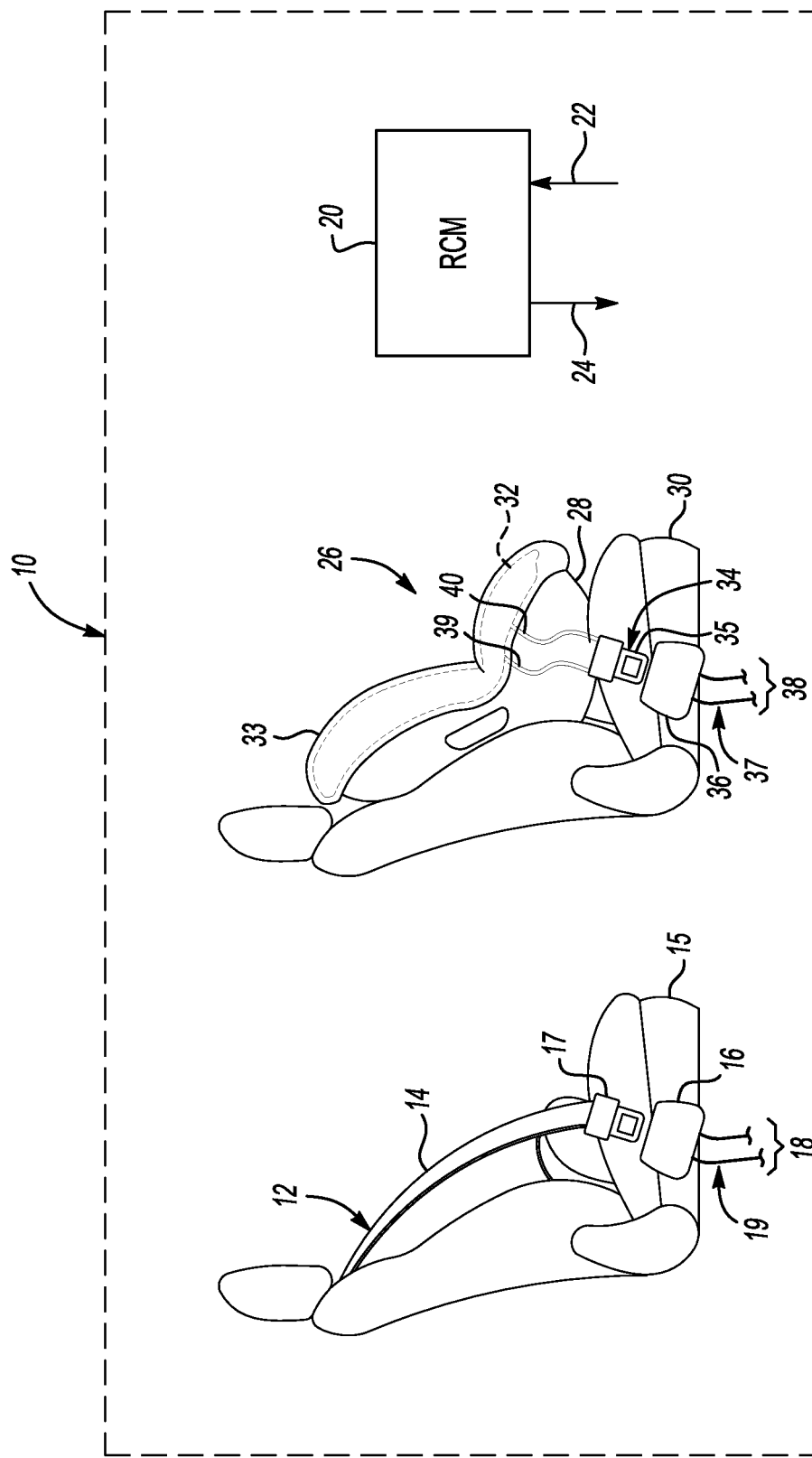
FIG. 1 shows a partially schematic view of a vehicle and child restraint system in accordance with embodiments of the present invention.

FIG. 1 shows a vehicle 10 in accordance with an embodiment of the present invention. The vehicle 10 is equipped with a RIB system 12 that includes an inflatable occupant protection device in the form of an inflatable seatbelt (with shoulder strap) 14 attached to a vehicle seat 15. A connection system 19 includes a seatbelt buckle 16, which has an integrated inflator (not visible) configured to inflate the inflatable seatbelt 14 upon the occurrence of a predetermined event, such as a deceleration that is greater than some predetermined amount. The seatbelt buckle 16 cooperates with a connector 17, which can be fluidly attached to the buckle 16 to receive gas from the integrated inflator upon occurrence of the predetermined event.

The particular event that causes the inflator within the buckle 16 to inflate the belt 14 may be chosen, for example, by the vehicle manufacturer in accordance with any of a number of known trigger events. To communicate the trigger information to the inflator within the buckle 16, a wiring harness 18, which may be part of the connection system 19, is connected to a restraint control module (RCM) 20. The RCM 20 includes an input line 22 and an output line 24 which represent any number of inputs and outputs that the RCM 20 may use to communicate to and from various airbags, inflatable seatbelts, sensors, etc. Together, the RCM 20 and the various inflatable protection devices, along with various other components such as sensors—e.g., accelerometers—make up an inflatable occupant restraint system for the vehicle 10. Thus, an acceleration sensor may provide a signal to the RCM 20 through the input line 22 that indicates that various inflators should be activated to inflate the various inflatable protection devices. The RCM 20 then outputs signals to the various devices through the output 24, which may include a signal to the inflator within the buckle 16 received via the wiring harness 18.

The vehicle 10 also includes a child restraint system 26 in accordance with an embodiment of the present invention. The child restraint system 26 includes a portable child seat 28 configured to be secured to a seat 30 in the vehicle 10. The child seat 28 may be configured with LATCH compatible connectors that cooperate with LATCH connectors in the seat 30. Of course, alternative methods of attachment of the portable child seat 28 to the vehicle seat 30 may be used. The child restraint system 26 also includes an inflatable protection apparatus, which in the embodiment shown in FIG. 1, is an airbag 32 disposed within a seat cushion 33 of the child seat 28.

A fluid connector 34 is configured similarly to the connector 17, and includes a tongue 35 configured to cooperate with a RIB 36. At least one configuration of this type is employed in certain Ford Motor Company vehicles currently available for purchase. The RIB 36 is part of a connection system 37 that is part of the occupant restraint system of the vehicle 10. In particular, the RIB 36 is connected to the RCM 20 through a wiring harness 38, which may, in some cases, be considered part of the connection system 37. Upon the occurrence of the predetermined event, such as a large enough negative acceleration, the RCM 20 sends a signal through the wiring harness 38 to the RIB 36, and in particular to the integrated inflator within the RIB 36. Because the connector 34 is fluidly connected to the RIB 36 through the tongue 35, gas flows through the connector 34 and through conduits 39, 40 into the airbag 32. Thus, the child seat 28 is able to be integrated into the occupant restraint system of the vehicle 10, including receiving gas from a vehicle inflator, such as the inflator embedded within the RIB 36.

Figure 2:
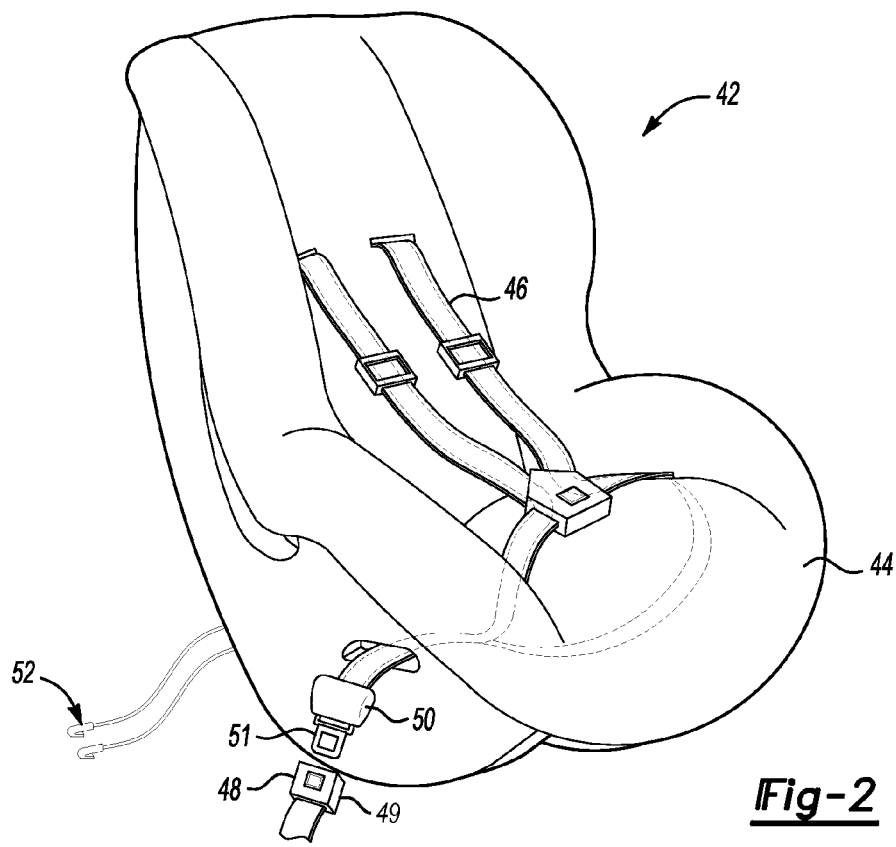
FIG. 2 shows a child restraint system in accordance with an embodiment of the present invention.

FIG. 2 shows a child restraint system 42 in accordance with an embodiment of the present invention. The child restraint system includes a portable child seat 44 that has an inflatable protection apparatus 46. In this embodiment, the inflatable protection apparatus 46 is configured as an inflatable seatbelt harness system that receives gas from a RIB 48, which is part of a vehicle restraint system. A connection system, represented by the RIB 48, is connectable to a fluid connector 50 having a tongue 51, which is configured to cooperate with the RIB 48, and in particular, the buckle 49, to receive gas when the vehicle occupant restraint system sends an appropriate signal to the inflator within the RIB 48. Also shown in the embodiment illustrated in FIG. 2 are LATCH connectors 52 that are configured to cooperate with mating LATCH connections within a vehicle seat. In this way, the child seat 44 is configured to be secured to a vehicle seat separately from the connection system, which functions to receive the gas and provide a conduit for inflating the inflatable belt system 46.

As described above, the connector 17 is configured to connect to and cooperate with the RIB 16 so that the inflatable belt and harness 14 will inflate upon the occurrence of a particular event. If the seatbelt 14 is used to connect the child seat 28 to the vehicle seat 15, the buckle (RIB) 16 will not be available to receive the connector 34 of the child seat 28. This potential issue is addressed by the tongue arrangement 54 shown in FIG. 3. The tongue arrangement 54 acts as a connector, similar to the connectors 17, 34 illustrated in FIG. 1, and the connector 50 shown in FIG. 2. The tongue arrangement 54 includes a tongue 56 configured to cooperate with a RIB to act as a conduit for gas. The tongue arrangement 54 may replace a connector, such as the connector 17 shown in FIG. 1, so that when the seatbelt 14 is connected to RIB 16, the connector 34 on the child seat 28 can be connected to the RIB 16 through an input port 60. Alternatively, the tongue arrangement 54 may replace a connector, such as the connector 34 on the child seat 28. In this way, a child seat in accordance with embodiments of the present invention can be connected to a RIB through the tongue arrangement 54, while still providing a connection point for a connector, such as the connector 17, connected to an inflatable belt system.

Figure 3:
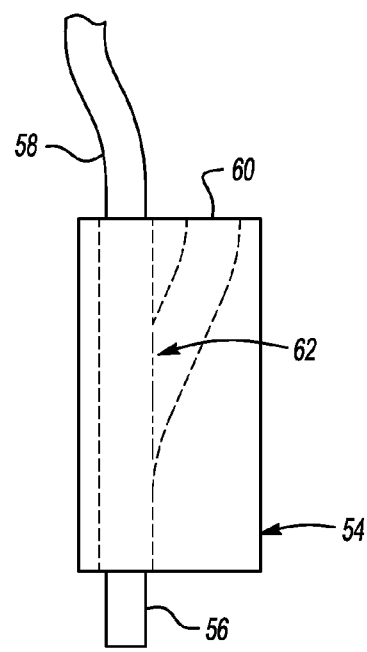
FIG. 3 shows a portion of a child restraint system in accordance with embodiments of the present invention.

A barrier 62, illustrated by a phantom line in FIG. 3, may separate the input port 60 from the conduit between the tongue 56 and an inflatable belt 58 (which may be a vehicle seatbelt, such as the seatbelt 14, or it could be a child seatbelt, such as the seatbelt harness system 46). Thus, the tongue 56 may be fluidly connected to the belt 58, but not fluidly connected to the input port 60. Alternatively, the two channels can be open to each other such that gas from a RIB is simultaneously provided to the inflatable belt 58 and to an inflatable belt connected to another connector, such as the connector 17 or the connector 34, both shown in FIG. 1. As explained above, the fluid connection system between a tongue connector and a RIB is currently used in a number of vehicles and is not shown in detail in FIG. 3. Where an input port includes a barrier, such as the barrier 62, an inflatable belt connected to it would not receive gas from a RIB and therefore would not inflate; however, the inflatable belt would still act as a restraint in case of a sudden deceleration.

Figure 4:
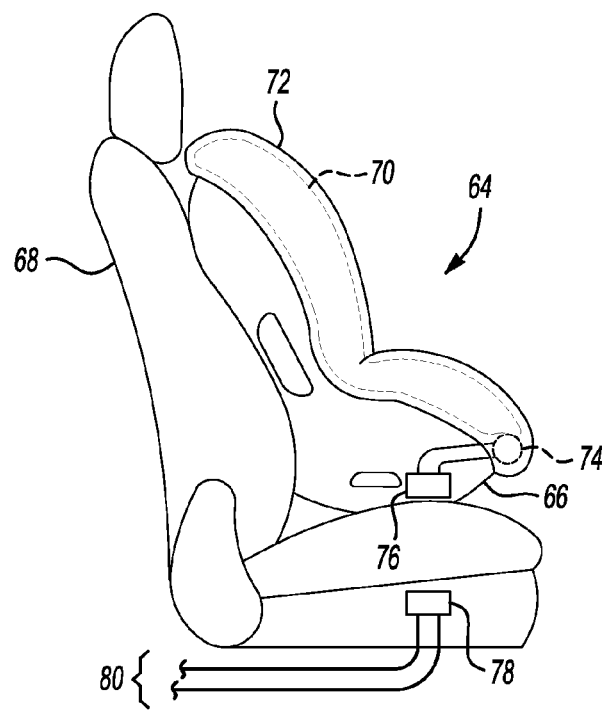
FIG. 4 shows a child restraint system in accordance with an embodiment of the present invention.

FIG. 4 shows a child restraint system 64 in accordance with an embodiment of the present invention. The child restraint system includes a portable child seat 66 configured for attachment to a vehicle seat 68, in a manner such as described above. The child seat 66 includes an airbag 70 embedded in a seat cushion 72. In this embodiment, the child seat 66 includes an inflator 74 integrated into the seat cushion 72 and configured to inflate the airbag 70. An electrical connector 76 is connected to the inflator 74, and is configured for attachment to a mating electrical connector 78, which is part of a connection system connected to a vehicle occupant restraint system, such as described above in conjunction with FIG. 1. A wiring harness 80 provides a connection to an RCM, such as the RCM 20 shown in FIG. 1. Thus, both power and a deployment signal can be sent through the electrical connector 78 to the electrical connector 76 and to the inflator 74 to deploy the airbag 70 in case of a predetermined event such as described above.

Figure 5:
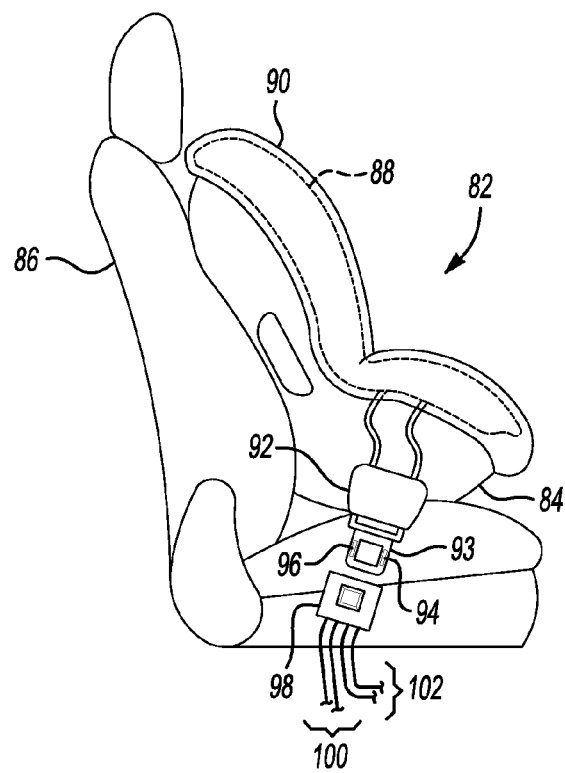
FIG. 5 shows a child restraint system in accordance with another embodiment of the present invention.

Connectors such as the connector 34 shown in FIG. 1, the connector 50, shown in FIG. 2, and the connector 76 shown in FIG. 4, represent a connection interface connected to a child seat as part of a child restraint system in accordance with embodiments of the present invention. Each of these connection interfaces are adapted for connection to an occupant restraint system of a vehicle. Another connection type is illustrated in FIG. 5. In this figure, a child restraint system 82 includes a portable child seat 84 configured for connection to a vehicle seat 86. An airbag 88 is disposed within a seat cushion 90 and is configured to be inflated by an inflator (not visible) within a connection interface, or connector 92. Because the inflator is integrated into the connector 92, a tongue 93 of the connector 92 does not need to be fluidly connected to an occupant restraint system of the vehicle; rather, it needs to be electrically connected to the vehicle restraint system. To facilitate this, electrical connections 94, 96 are configured for connection to a buckle 98 having mating electrical connections (not visible) disposed therein. Wires 100, 102 connected to the buckle 98 may also be connected to an RCM, such as the RCM 20 shown in FIG. 1. The wires 100 may provide, for example, an interface between the RCM and the inflator disposed within the connector 92. Conversely, the wires 102 may provide, for example, an interface between an RCM and a buckle switch—i.e., these wires provide a signal to indicate that the connector 92 is secured to the buckle 98. Although the connections between the RCM and the inflators in the various embodiments illustrated and described above have been hardwired, other embodiments may include a wireless connection between the RCM and an inflator. In one such example, the wires 102 may still be provided to indicate that the buckle switch has been activated by the connection of the connector 92 to the buckle 98; however, the wires 100 may be eliminated in favor of a wireless signal from an RCM directly to the inflator integrated into the connector 92.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle having an inflatable occupant restraint system including an inflatable occupant protection device and an inflator configured to inflate the inflatable occupant protection device upon occurrence of a predetermined event, the vehicle comprising:
   a child restraint system including: a portable child seat and an inflatable protection apparatus attached to the child seat and having a fluid connector operatively attached thereto; and
   a connection system operatively connected to the occupant restraint system and configured for connection to the fluid connector such that the inflator inflates the inflatable protection apparatus attached to the child seat when the predetermined event occurs, the child seat being configured to be secured to a seat in the vehicle at least in part with the connection system.

2. The vehicle of claim 1, wherein the inflatable protection apparatus attached to the child seat is one of an inflatable belt or an airbag.

3. The vehicle of claim 1, wherein the child seat is configured to be further secured to the seat in the vehicle separately from the connection system.

4. The vehicle of claim 1, wherein the inflatable occupant protection device includes a tongue arrangement having an input port configured to receive the fluid connector.

5. The vehicle of claim 1, wherein an input port is configured to fluidly connect the inflatable occupant protection device with the inflator such that the inflatable occupant protection device is inflated when the predetermined event occurs.

6. The vehicle of claim 1, wherein an input port is configured to connect the inflatable occupant protection device with the child restraint system such that the inflatable occupant protection device is not inflated when the predetermined event occurs.

7. A vehicle having an inflatable occupant restraint system including an inflatable occupant protection device and an inflator operable to inflate the inflatable occupant protection device when a predetermined event occurs, comprising:
   a portable child seat having an inflatable child protection apparatus attached thereto, the child protection apparatus including a fluid connector having a tongue; and
   a connection system operatively connected to the occupant restraint system and including a buckle connectable to the tongue of the fluid connector such that the child protection apparatus is inflated when the predetermined event occurs.

8. The vehicle of claim 7, wherein the child protection apparatus is inflated by the inflator when the predetermined event occurs.

9. The vehicle of claim 8, wherein the buckle includes the inflator disposed therein.

10. The vehicle of claim 9, wherein the tongue is part of a tongue arrangement that includes an input port configured to receive a portion of the inflatable occupant protection device.

11. The vehicle of claim 10, wherein the input port is configured to fluidly connect the inflatable occupant protection device with the inflator such that the inflatable occupant protection device is inflated when the predetermined event occurs.

12. The vehicle of claim 10, wherein the input port is configured to connect the inflatable occupant protection device with the inflator such that the inflatable occupant protection device is not inflated when the predetermined event occurs.

13. The vehicle of claim 7, wherein the child seat is configured to be secured to a seat in the vehicle at least in part with the connection system.

14. A child restraint system for a vehicle, the vehicle having an inflatable occupant restraint system including an inflatable occupant protection device and an inflator configured to inflate the inflatable occupant protection device upon the occurrence of a predetermined event, the child restraint system comprising:
   a portable child seat;
   an inflatable protection apparatus attached to the child seat; and
   a connection interface connected to the child seat and adapted for connection to the occupant restraint system such that the inflator inflates the inflatable protection apparatus attached to the child seat when the predetermined event occurs, the child seat being configured to be secured to a seat in the vehicle at least in part with the connection system.

15. The child restraint system of claim 14, wherein the child seat is configured to be further secured to the seat in the vehicle separately from the connection interface.

16. The child restraint system of claim 14, wherein the connection interface includes an input port configured to receive a portion of the inflatable occupant protection device.

17. The child restraint system of claim 16, wherein the input port is configured to fluidly connect the inflatable occupant protection device with the inflator such that the inflatable occupant protection device is inflated when the predetermined event occurs.

18. The child restraint system of claim 16, wherein the input port is configured to connect the inflatable occupant protection device with the child restraint system such that the inflatable occupant protection device is not inflated when the predetermined event occurs.

* * * * *